United States Patent
Terracciano et al.

[11] Patent Number: 5,957,323
[45] Date of Patent: *Sep. 28, 1999

[54] THERMAL DISH WITH LID LOCKING HANDLES

[75] Inventors: Simone Terracciano, Milan; Stefano Benedetto Terracciano, Buccinasco, both of Italy

[73] Assignee: Ater S.r.l., Colazza, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/889,226

[22] Filed: Jul. 8, 1997

[30] Foreign Application Priority Data

Jul. 9, 1996 [IT] Italy ................. BS960058 U

[51] Int. Cl.$^6$ .................................. B65D 25/28
[52] U.S. Cl. .................... 220/574; 220/326; 220/756; 220/764
[58] Field of Search ................... 220/326, 324, 220/318, 772, 756, 762, 764, 574, 574.1, 575, 912, 908; 312/284

[56] References Cited

U.S. PATENT DOCUMENTS

| | | | |
|---|---|---|---|
| 866,318 | 9/1907 | Wilson | 220/772 |
| 1,137,078 | 4/1915 | Nicodemus et al. | 220/772 |
| 2,035,832 | 3/1936 | Parkin | 220/326 |
| 2,758,458 | 8/1956 | Carlson . | |
| 2,843,440 | 7/1958 | Billig et al. . | |
| 2,873,880 | 2/1959 | Poulos | 220/318 |
| 3,416,701 | 12/1968 | Kramer | 220/318 |
| 4,691,840 | 9/1987 | Ferbrache | 220/908 |
| 5,160,060 | 11/1992 | Garofalo, Jr. | 220/908 |
| 5,226,553 | 7/1993 | Fiore | 220/764 |
| 5,301,829 | 4/1994 | Chrisco | 220/756 |
| 5,573,741 | 11/1996 | Riley | 220/324 |
| 5,706,968 | 1/1998 | Riley | 220/326 |

*Primary Examiner*—Stephen Castellano
*Attorney, Agent, or Firm*—McGlew and Tuttle, P.C.

[57] ABSTRACT

A thermal dish including a body and a lid that are made of suitable material. The body is provided with two opposing handles, which are capable of linear movement to the inside and to the outside of the dish, and in which the handles are superimposed on parts of the lid, locking the lid when these handles are moved to the inside and unlocking the lid when the handles are moved to the outside of the lid.

17 Claims, 1 Drawing Sheet

THERMAL DISH WITH LID LOCKING HANDLES

FIELD OF THE INVENTION

The present invention relates to containers in general and more particularly pertains to cooling dishes and more specifically thermal dishes, especially, but not exclusively, heat resistant and shock resistant borosilicate glass (e.g. such as the material used in products known by the trademark PYREX) dishes.

BACKGROUND OF THE INVENTION

One type of dish used to hold, transport, and preserve the hot contents of food and food containers, such as PYREX dishes is already known. This prior-art dish has a body made of a heat-insulating material having a lid to hermetically seal same. The lid is usually locked tightly on the body by means of a bayonet clamp.

SUMMARY AND OBJECTS OF THE INVENTION

On the other hand, the object of the present invention is to provide a thermal dish/container of the above-mentioned type, in which the body and the lid are interlocked by means of a novel combination of linear movement elements, so as to make the entire unit simpler and more convenient and practical to use.

This object is accomplished with a dish whose body is provided with two opposing handles, which are capable of linear movements to the inside and to the outside (radially inwardly and radially outwardly) of the dish and in which these handles are superimposed on parts of the lid, tightly locking the lid when these handles are moved to the inside of the body and unlocking the lid when they are moved to the outside.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 4:
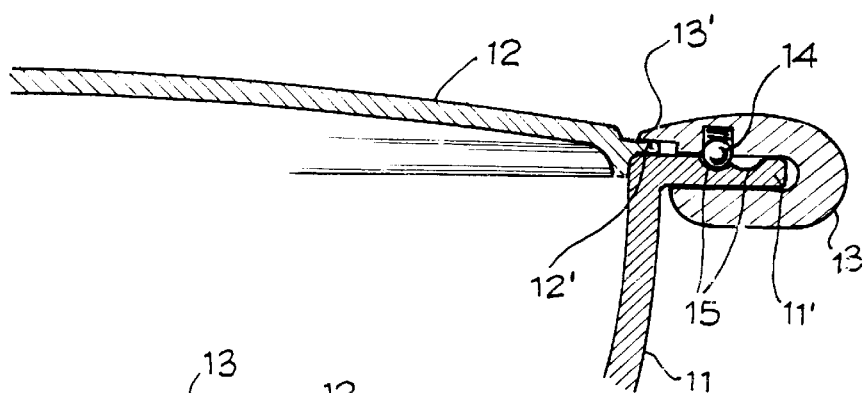
FIG. 4 is a partial sectional view taken along the line IV—IV of FIG. 1.
Figure 3:
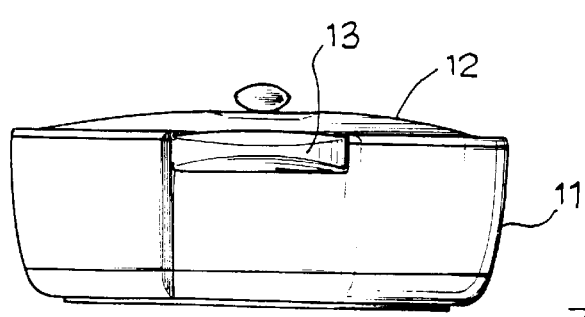
FIG. 3 is an end view thereof, i.e., on a handle side.

Referring to the drawings in particular, the dish/container according to the invention comprises a bowel shaped body 11 and a lid 12, both made of suitable insulating material. The material may be borosilicate glass (such as the material used in products sold under the trademark PYREX). On two opposite parts of its edge, the bowel shaped body 11 has two lugs 11'. On each side of these lugs 11' there is mounted a handle 13. Both handles 13 are guided. Each of the guided handles 13 can be moved linearly to the inside and to the outside of the dish, e.g. radially inwardly and radially outwardly. Fastening means is provided for limiting the movement of each of the handles. This allows two extreme positions defined by the fastening means. The fastening means preferably comprises a sphere 14, and notches 15, as specifically shown in FIG. 4.

Each handle 13 has a locking lip 13' turned towards the inside of the body 11. The locking lip 13' interacts with the lid 12. The lid 12 is arranged and centered appropriately on the body 11.

Figure 2:
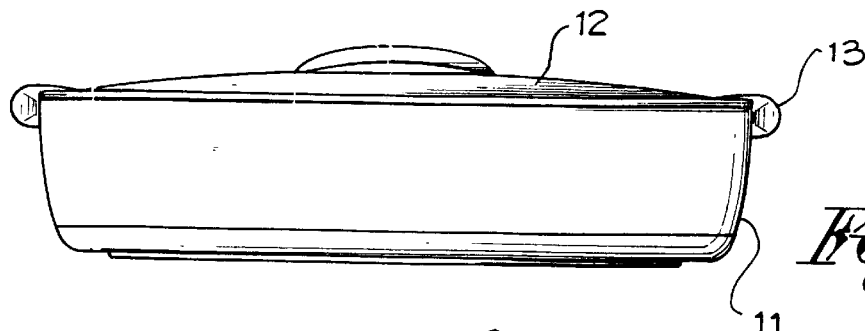
FIG. 2 is a side view thereof.
Figure 1:
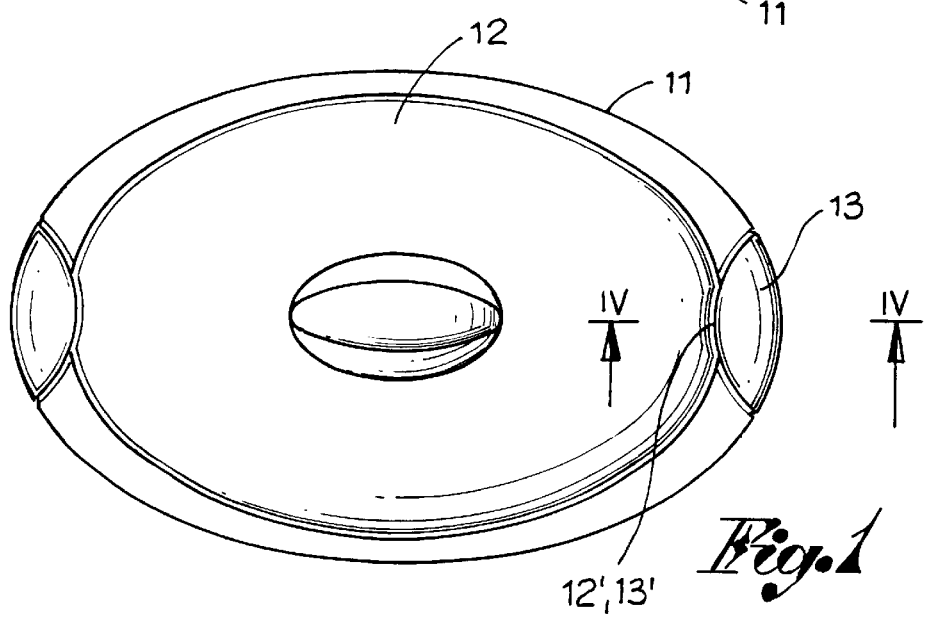
FIG. 1 is a top view of the dish according to the present invention.

Corresponding to each handle 13, the lid has a step or extending portion 12', on or into which the locking lip 13' of the same handle engages when this locking lip 13' is moved to the inside of the dish, as shown in the drawings, especially FIG. 1.

Thus, in order to lock the lid 12 on the body 11 once the lid has been placed there, it is sufficient to simply move the handles 13 towards the lid itself, without any rotating or other movement, until their lip 13' is superimposed on or in the step 12' of the lid 12. The unlocking of the lid to open the dish is achieved in an equally simple manner by moving the handles away from the lid, until it is released.

While a specific embodiment of the invention has been shown and described in detail to illustrate the application of the principles of the invention, it will be understood that the invention may be embodied otherwise without departing from such principles.

What is claimed is:

1. A thermal dish container, comprising:

a bowl shaped body including lugs provided with two opposing handles mounted for linear movement toward the inside and toward the outside of the body said handles each including a lip;

a lid having an extending portion lying on said lugs, said lips of said handles being each in a first direct superimposed position on said extending portion of said lid, locking said lid to said dish when said handles are moved to the inside and unlocking said lid when said handles are moved toward the outside of the body into a second position;

locking means with a sphere for locking said handle in one of said first position and said second position.

2. A dish container in accordance with claim 1, wherein said lugs are provided on two opposing parts of an edge of said body;

said lips of said handles are locking lips each turned towards the inside of said body;

said lid extending portion includes two steps corresponding to said handles on which said locking lips of the said handles are superimposed and engage when said handles are moved to an inside of said body.

3. A dish container in accordance with claim 2, wherein said lugs and said handles have complementary fastening means to define positions for locking and unlocking said lid on said body.

4. A thermal dish container, comprising:

a bowel shaped body including a lug provided with a handle mounted for linear movement between a first position and a second position, said handle including a lip;

a lid having an extending portion lying on said lug, said lip of said handle being directly superimposed on said extending portion of said lid in said first position to lock said lid, said lip being arranged to not be superimposed on said extending portion in said second position in order to unlock said lid;

locking means with a sphere for locking said handle in one of said first position and said second position.

5. A dish container in accordance with claim 4, further comprising:

a second lug on said body;

a second handle mounted on said second lug for linear movement between a second handle first position and a second handle second position, said second handle including a lip;

said lid having a second extending portion lying on said second lug, said lip of said second handle being superimposed on said extending portion of said lid in said second handle first position to lock said lid, said lip of said second handle being arranged to not be superimposed on said second extending portion in said second handle second position in order to unlock said lid.

6. A dish container in accordance with claim 5, wherein said lugs are provided on two opposing parts of an edge of said body;

said lips of said handles are locking lips each turned towards the inside of said body;

said lid extending portion includes two steps corresponding to said handles on which said locking lips of the said handles are superimposed and engage when said handles are moved to an inside of said body.

7. A dish container in accordance with claim 5, wherein said lugs and said handles have complementary fastening means to define positions for locking and unlocking said lid on said body.

8. A thermal dish container, comprising:

a bowel shaped body provided with a lug and a handle mounted on the lug for linear movement between a first position and a second position, said handle including a lip;

a lid having an extending portion lying on said lug, said lip of said handle being directly superimposed on said extending portion of said lid in said first position to lock said lid between said handle and said lug, said lip being arranged to not be superimposed on said extending portion in said second position in order to unlock said lid;

locking means with a sphere for locking said handle in one of said first position and said second position.

9. A dish container in accordance with claim 8, further comprising:

a second handle mounted on another lug for linear movement between a second handle first position and a second handle second position said second handle having a lip;

said lid having a second extending portion, said lip of second handle being directly superimposed on said extending portion of said lid in said second handle first position to also lock said lid, said lip being arranged to not be superimposed on said second extending portion in said second handle second position to unlock said lid.

10. A dish container in accordance with claim 9, wherein said lips of said handles are locking lips each turned towards the inside of said body;

said lid extending portion includes two steps corresponding to said handles on which said locking lips of the said handles are superimposed and engage when said handles are moved to an inside of said body.

11. A dish container in accordance with claim 9, wherein said lugs and said handles have complementary fastening means to define positions for locking and unlocking said lid on said body.

12. A dish container in accordance with claim 8, wherein:

said lug includes a notch receiving said sphere when said handle is in said first position.

13. A dish container in accordance with claim 12, wherein:

said lug includes another notch receiving said sphere when said handle is in said second position.

14. A dish container in accordance with claim 12, wherein:

said locking means includes a spring biasing said sphere into said notch.

15. A dish container in accordance with claim 8, wherein:

said movement of said handle is substantially all linear and all radial.

16. A dish container in accordance with claim 8, wherein:

said locking means also fastens said handle to said lug in a linearly movable manner.

17. A dish container in accordance with claim 8, wherein:

said handle is mounted directly on said lug;

said lug extends completely around said body;

said extended portion of said lid includes a step, said lip of said handle extends into said step of said extended portion of said lid.

* * * * *